United States Patent
Civay et al.

(10) Patent No.: US 10,552,567 B2
(45) Date of Patent: Feb. 4, 2020

(54) AUTOMATED REDESIGN OF INTEGRATED CIRCUITS USING RELAXED SPACING RULES

(71) Applicant: GLOBALFOUNDRIES INC., Grand Cayman (KY)

(72) Inventors: Deniz E. Civay, Waterford, NY (US); Elise Laffosse, Santa Clara, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 117 days.

(21) Appl. No.: 15/873,225

(22) Filed: Jan. 17, 2018

(65) Prior Publication Data

US 2019/0220567 A1    Jul. 18, 2019

(51) Int. Cl.
| | |
|---|---|
| G06F 17/50 | (2006.01) |
| G03F 7/20 | (2006.01) |
| H01L 27/02 | (2006.01) |
| H01L 23/522 | (2006.01) |

(52) U.S. Cl.
CPC ...... *G06F 17/5072* (2013.01); *G03F 7/70433* (2013.01); *G06F 17/5045* (2013.01); *G06F 17/5068* (2013.01); *G06F 17/5081* (2013.01); *H01L 23/522* (2013.01); *H01L 27/0207* (2013.01); *G06F 2217/12* (2013.01)

(58) Field of Classification Search
CPC ............. G06F 17/5072; G06F 17/5081; G06F 17/5045; G06F 2217/12; H01L 27/02; H01L 27/0207; H01L 23/522; G03F 7/70433
See application file for complete search history.

(56) References Cited

U.S. PATENT DOCUMENTS

| | | | | |
|---|---|---|---|---|
| 5,018,074 A | * | 5/1991 | Griffith | G06F 17/5068 |
| | | | | 257/E27.108 |
| 5,620,916 A | * | 4/1997 | Eden | H01L 23/5226 |
| | | | | 257/E23.145 |
| 5,936,868 A | | 8/1999 | Hall | |
| 6,756,242 B1 | | 6/2004 | Regan | |
| 7,076,750 B1 | * | 7/2006 | Lukanc | G06F 17/5072 |
| | | | | 257/774 |
| 7,194,725 B1 | | 3/2007 | Lukanc et al. | |
| 7,404,167 B2 | * | 7/2008 | Chuang | G03F 1/144 |
| | | | | 716/52 |
| 7,574,685 B1 | * | 8/2009 | Dong | G06F 17/5068 |
| | | | | 716/118 |

(Continued)

*Primary Examiner* — Naum Levin
(74) *Attorney, Agent, or Firm* — Gibb & Riley, LLC; David A. Cain, Esq.

(57) ABSTRACT

Methods and systems access an original integrated circuit (IC) design. The smallest spacing between elements in the original IC design is an "original" minimum spacing. These methods and systems automatically convert the original IC design to a reduced IC design, and the smallest spacing between elements in the reduced IC design is a "reduced" minimum spacing that is less than the original minimum spacing. Such methods and systems either automatically replace a single via in the original IC design with multiple vias in the reduced IC design (in an area where the single via was located in the original IC design) or automatically replace the single via in the original IC design with a via bar in the reduced IC design (in an area where the single via was located in the original IC design).

20 Claims, 12 Drawing Sheets

(56) References Cited

U.S. PATENT DOCUMENTS

| | | | |
|---|---|---|---|
| 7,604,909 B2* | 10/2009 | Hsu | G03F 1/36 430/311 |
| 7,765,510 B2* | 7/2010 | Ohtsuka | G06F 17/5077 716/129 |
| 7,783,995 B2 | 8/2010 | Joshi | |
| 7,805,692 B2* | 9/2010 | Jeng | G06F 17/5081 716/122 |
| 7,939,445 B1* | 5/2011 | Sutardja | H01L 21/76838 257/E21.575 |
| 8,037,428 B2* | 10/2011 | Tong | G06F 17/5081 716/51 |
| 8,151,225 B2* | 4/2012 | Maeda | G06F 17/5068 378/35 |
| 8,171,445 B2* | 5/2012 | Ueda | G06F 17/5077 716/110 |
| 8,455,932 B2* | 6/2013 | Khakifirooz | H01L 27/0207 257/270 |
| 8,627,242 B1* | 1/2014 | Kuo | G03F 1/70 716/52 |
| 8,726,200 B2* | 5/2014 | Fu | G03F 1/70 716/51 |
| 8,726,208 B2* | 5/2014 | Chen | G06F 17/5081 716/111 |
| 8,775,998 B2* | 7/2014 | Morimoto | G06F 17/5045 257/528 |
| 8,807,948 B2* | 8/2014 | Luo | G06F 17/5081 416/136 |
| 8,924,896 B2* | 12/2014 | Wang | G06F 17/5081 716/54 |
| 9,029,230 B2* | 5/2015 | Xiao | H01L 23/481 438/381 |
| 9,112,000 B2* | 8/2015 | Blatchford | H01L 21/76813 |
| 9,594,864 B2 | 3/2017 | Song et al. | |
| 9,672,311 B2* | 6/2017 | Hamouda | G06F 17/5081 |
| 9,922,161 B2* | 3/2018 | Kahng | G06F 17/5081 |
| 10,061,209 B2* | 8/2018 | Mailfert | G03F 1/36 |
| 2002/0035719 A1* | 3/2002 | Tanaka | G06F 17/5081 716/119 |
| 2010/0009270 A1* | 1/2010 | Thiele | G03F 1/36 430/5 |
| 2012/0180014 A1* | 7/2012 | Fang | G06F 17/5081 716/112 |
| 2015/0379188 A1* | 12/2015 | Kahng | G06F 17/5081 716/53 |
| 2018/0150589 A1* | 5/2018 | Yang | G06F 17/5077 |

\* cited by examiner

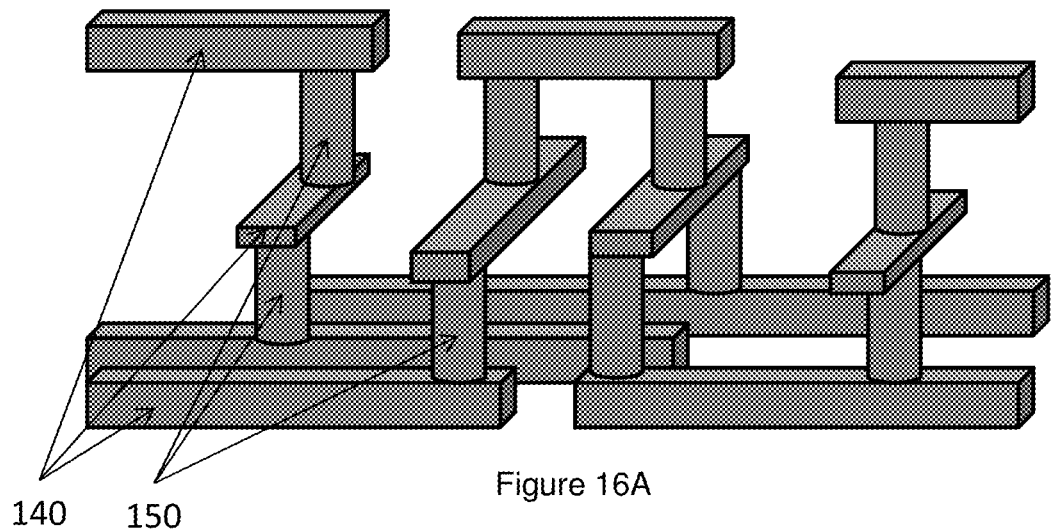
140   150         Figure 16A
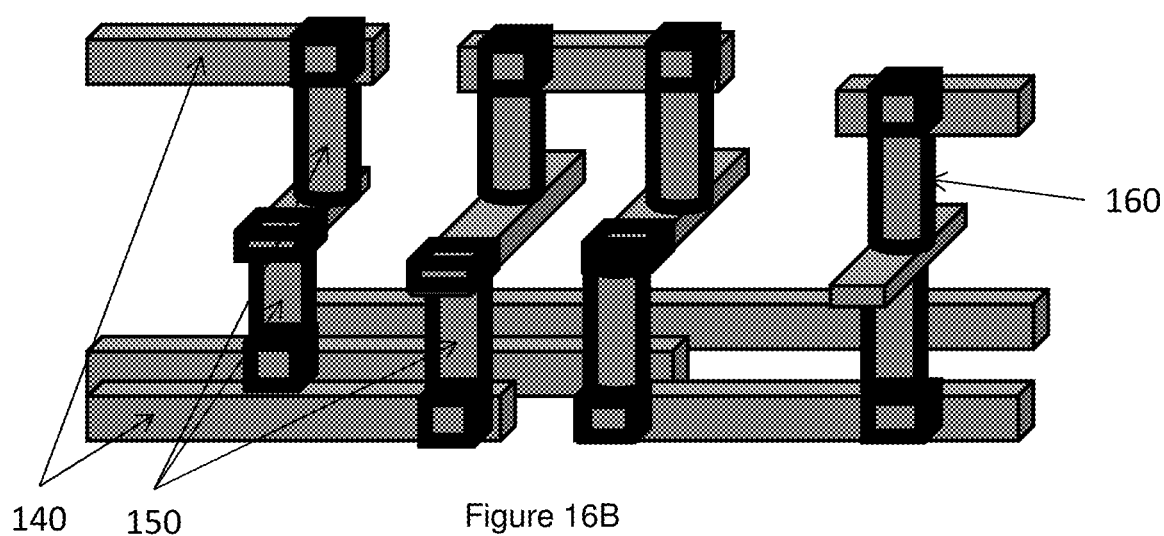
                                          160
140   150         Figure 16B
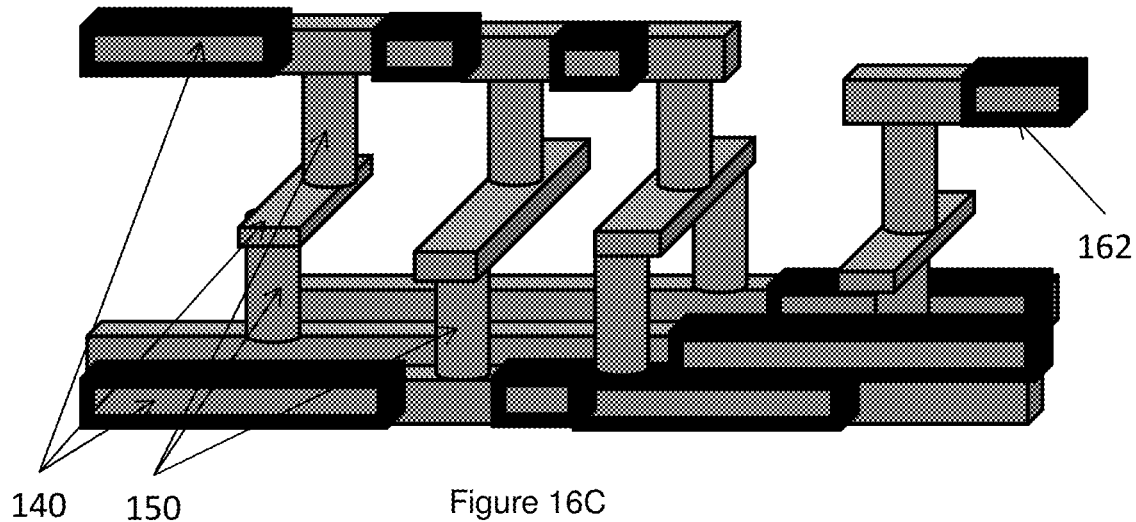
                                          162
140   150         Figure 16C

AUTOMATED REDESIGN OF INTEGRATED CIRCUITS USING RELAXED SPACING RULES

BACKGROUND

Field of the Invention

The present disclosure relates to design and manufacture of integrated circuits, and more specifically to an automated redesign of integrated circuits using relaxed spacing rules afforded by advances in items such as photolithographic masks that are used to manufacture such integrated circuits.

Description of Related Art

Rules are established to limit how closely conductive components can be placed within an integrated circuit (IC) design in order to, for example, reduce the chance of a short circuit during manufacturing. These spacing (and other) rules are often based on the limits which manufacturing technology has reached. In one example, the features within masks that are used in photolithographic processing can only reliably be formed down to a minimum size, which limits how small the IC features can be made.

When technological improvements are found (such as the utilization of extended ultraviolet (EUV) masks), IC features can be made smaller in, for example, photolithographic processing; and this allows the spacing rules to be changed (or relaxed). For example, EUV processing enables smaller scale patterning, due to the smaller wavelength of light used in the patterning.

One issue that occurs is the time required to revise existing IC designs that were generated under an outdated set of design rules. This is especially true when only one manufacturing aspect (e.g., photolithographic processing) is improved, without a corresponding improvement in other technologies (such as insulator quality, electrical bias control, feature alignment, ease of contact formation, etc., to name but a few) because such improvements may only allow a limited number of IC features to be reduced in size, or spaced more closely. Additionally, the spacing between features and the length of features can define or control the functionality of the IC design, which would prevent the spacing and size of such features from being altered. In other words, many improvements in IC manufacturing may not allow the entire IC design to be reduced in size uniformly; and, instead only a limited number of IC design aspects may be able to take advantage of the manufacturing improvement.

This makes it very time consuming, difficult, cumbersome, risky, and expensive to only change the aspects of the design that can take advantage of a specific manufacturing improvement, such as EUV processing, while leaving other aspects of the IC design relatively unchanged. Therefore, it is very challenging for manufacturers to change their IC designs once they are fixed; and the advantages manufacturing improvements offer in design flexibility are challenging for manufacturers to implement in their existing IC designs. Rather than revising existing IC designs, many simply continue to use the existing design with existing equipment and processes; while others undertake the time, expense, and risk of generating a completely new IC design, when the manufacturing improvements that arise have sufficient significance.

SUMMARY

Various methods herein access an original integrated circuit (IC) design. The smallest spacing between elements in the original integrated circuit design is referred to herein as an original minimum spacing. These methods automatically convert the original IC design to a reduced IC design, as described below. The smallest spacing between elements in the reduced IC design is a reduced minimum spacing that is less than the original minimum spacing. Further, the original IC design utilizes multiple lithographic masks to land vias on conductive structures, while the reduced IC design utilizes a single lithographic mask to land the same vias on the same conductive structures in the original IC design.

Additionally, these methods automatically measure the unaltered spacing of the vias in the reduced IC design (in locations where the vias were located in the original IC design). This allows such methods to automatically replace a single via in the original IC design with multiple vias in the reduced IC design, in areas where the single via was located in the original IC design, if the unaltered spacing around the single via equals or exceeds a first spacing measure. Alternatively, these methods can automatically replace the single via in the original IC design with a via bar in the reduced IC design, in areas where the single via was located in the original IC design, if the unaltered spacing around the single via is between the reduced minimum spacing and the first spacing measure.

Additionally, such methods can place the vias in the reduced IC design in different locations relative to where corresponding ones of the vias were located in the original IC design, so as to decrease spacing between vias, but increase spacing between vias and adjacent conductive features. In other alternatives, methods herein can reduce the distances between conductive line ends to the reduced minimum spacing, while maintaining locations of the vias that are adjacent the conductive line ends, such that the vias are in the same locations where the vias were located in the original IC design. More specifically, the process of reducing distances between conductive line ends can be performed by extending lengths of the conductive lines. Also, these methods can reduce the widths of cuts made on conductive lines to the reduced minimum spacing, while maintaining locations of the vias that are adjacent the cuts in the same locations where the vias were located in the original IC design.

Methods herein can also evaluate whether there is movement flexibility (or density flexibility) within all the wiring levels of the unmodified reduced design. Density flexible (or movement flexible) regions are regions that do not affect the functionality of the IC. In contrast, density locked regions are those regions of an IC design where the lengths of the features, and the spacing between features actually defines or affects the functionality of that portion of the IC. Density locked regions should not be changed, because such would change or alter the functionality of the IC. In contrast, density flexible (or movement flexible) regions, which do not affect the functionality of the IC, can be changed. When there is movement flexibility in all levels, these methods may uniformly reduce the size of features within identified regions of the wiring levels of the unmodified reduced design, but again only if the identified regions of all affected wiring levels have movement flexibility.

Additionally, various manufacturing system herein include, among other components, at least one electronic storage that maintains the original integrated circuit (IC) design, and a processor operatively connected to the electronic storage. Again, the smallest spacing between the vias in the original integrated circuit design is referred to as the original minimum spacing. The processor automatically converts the original IC design to a reduced IC design, and again, the smallest spacing between elements in the reduced IC design is referred to as the reduced minimum spacing, and such is less than the original minimum spacing.

The processor automatically measures unaltered spacing of the vias (where the vias in the reduced IC design are in unaltered locations where the vias were located in the original IC design). The processor can automatically replace a single via in the original IC design with multiple vias in the reduced IC design, in areas where the single via was located in the original IC design, if the unaltered spacing around the single via equals or exceeds a first spacing measure (which is larger than the reduced minimum spacing). Alternatively, the processor can automatically replace the single via in the original IC design with a via bar in the reduced IC design, in areas where the single via was located in the original IC design, if the unaltered spacing around the single via is between the reduced minimum spacing and the first spacing measure (e.g., is less than first spacing measure).

Additionally, the processor can automatically place the vias in the reduced IC design in different locations relative to where corresponding ones of the vias were located in the original IC design to decrease spacing between vias and increase spacing between vias and adjacent conductive features. Also, the processor can automatically reduce distances between conductive line ends to the reduced minimum spacing, while maintaining locations of the vias that are adjacent the conductive line ends, such that the vias are in the same locations where the vias were located in the original IC design. For example, the processor can reduce the distances between conductive line ends by extending lengths of the conductive lines. Further, the processor can automatically reduce widths of cuts made on conductive lines to the reduced minimum spacing, while maintaining locations the vias that are adjacent the cuts in the same locations where the vias were located in the original IC design.

The processor can also evaluate whether there is movement flexibility (or density flexibility) within all the wiring levels of the unmodified reduced design. When there is movement flexibility in all levels, the processor may uniformly reduce the size of features within the wiring levels of the unmodified reduced design, but again only if the identified regions of all affected wiring levels have movement flexibility. Also, manufacturing equipment is operatively connected to the processor, and such manufacturing equipment manufactures ICs using the reduced IC design.

BRIEF DESCRIPTION OF THE DRAWINGS

The embodiments herein will be better understood from the following detailed description with reference to the drawings, which are not necessarily drawn to scale and in which:

FIGS. 16A-16C are perspective views showing multiple wiring levels and vias of an integrated circuit design, according to embodiments herein;

DETAILED DESCRIPTION

As mentioned above, it is very challenging for manufacturers to change their IC designs once they are fixed; and the advantages manufacturing improvements offer in design flexibility are challenging for manufacturers to implement in their existing IC designs. In view of this, the methods and systems disclosed herein provide a competitive redesign of previously generated integrated circuit (IC) designs (which are sometimes referred to as customer IP) to automatically convert such previous IC designs developed under previous, more restricted rules, to new (relaxed) design rules. This allows the systems and methods herein to update regions of the design with a more competitive compatible design (such as one using EUV processing).

In greater detail, the inputs and outputs are graphic database system (GDS) or open artwork system (OAS) mask files, and the output results in modified IC designs, where the modifications depend on design needs. The program inputs can include the patterning type (double/triple patterning, self-aligned double patterning (SADP), etc.); EUV related rules, such as minimum spaces; user options (for example: redundant via addition or change to via bar); etc. This can therefore increase yield (using single level modifications); and/or increase density (using full chip modifications, which can be complex).

With respect to yield enhancement, using EUV processing as an exemplary rule modification, when EUV processing is implemented on the via level, there are opportunities to redesign the previous designs to enhance yield and/or reliability, for example by adding redundant vias, changing single vias to via bar or increasing the via enclosure to the metal. EUV processing allows smaller via spacing than the same mask (color) space in larger mask multi-pattern approaches. Thus, the methods and systems herein can identify same color vias (vias on the same mask) at minimum spacing and add a redundant via where possible, where metal above and below are present, no different color (different mask) via is present, compliance with other design rules, etc. Alternatively, existing single vias can be changed to via bars, which can also enhance yield and/or reliability. This can be manually chosen by the user, or can be automatic (hard coded). The methods and systems herein can also increase the size of the via enclosure to the metal by reducing the space between vias, to push them away from the metal line end.

Figure 1:
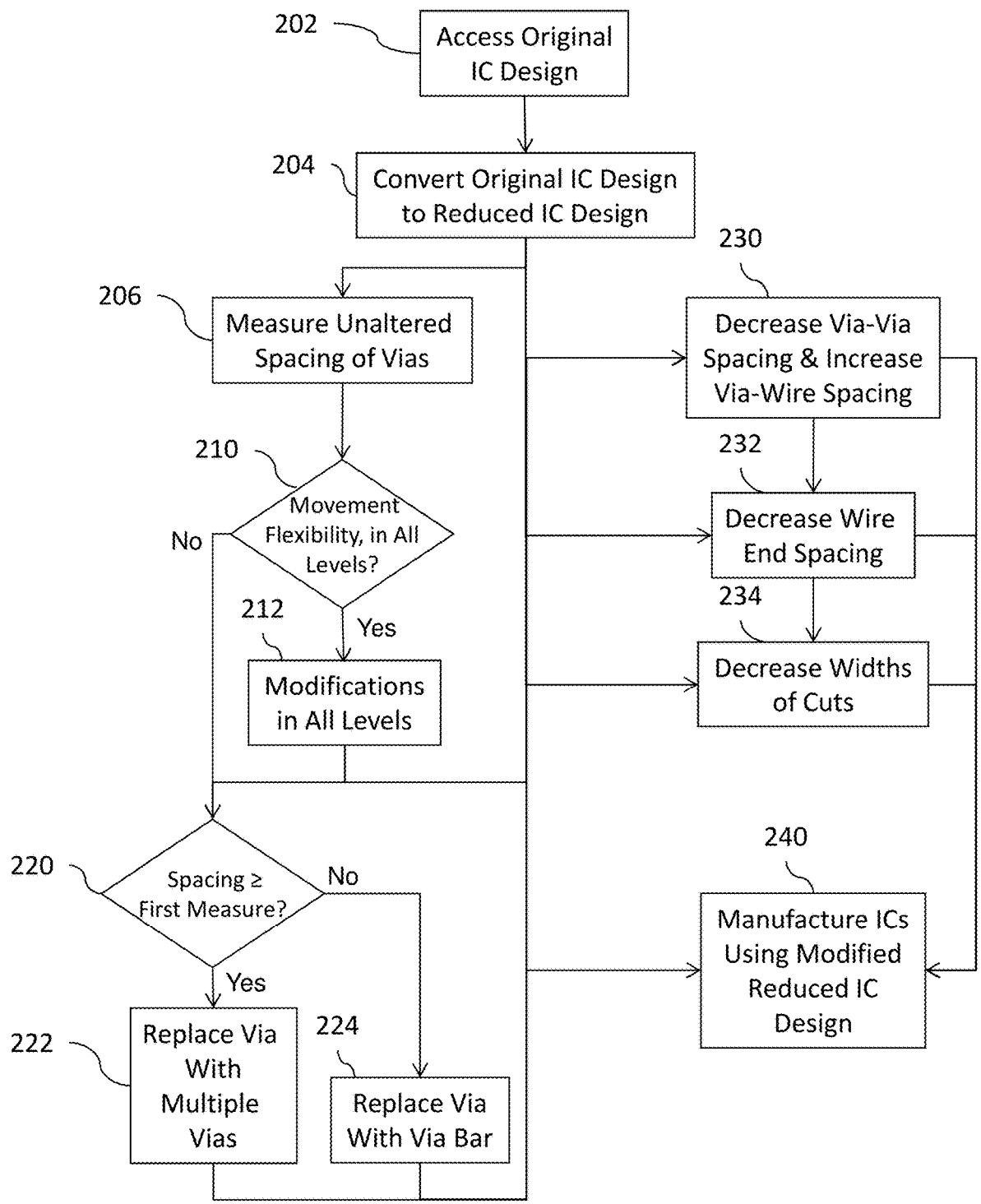
FIG. 1 is a flow diagram illustrating embodiments herein.

As shown in flowchart form in FIG. 1, various methods herein access an original IC design (item 202). The smallest allowed spacing between elements in the original integrated circuit design is referred to herein as an "original" minimum spacing.

These methods automatically convert the original IC design to a reduced IC design, in item 204, initially by relaxing (reducing) the minimum spacing. In other words, the smallest allowed spacing between elements in the reduced IC design is a "reduced" minimum spacing that is less than the original minimum spacing. In item 204, such methods place the vias and wires in the reduced IC design in same locations relative to where corresponding vias and wires were located in the original IC design to produce what is referred to herein as an unmodified reduced design. The unmodified reduced design includes multiple wiring levels separated by insulator levels, and the wiring levels are connected through the insulator levels by conductive vias.

As noted above, it is generally unworkable to uniformly reduce (scale) all aspects of the IC design when only one manufacturing process (e.g., EUV processing) advance is adopted, because a single advance in manufacturing processing may still have to comply with other restrictions, such as: the functionality of shapes, spacing, length, etc.; insulator/conductor characteristics; alignment accuracy; etc. Therefore, only a limited number of IC design aspects may be able to take advantage of the manufacturing improvement, and the processing shown in FIG. 1 can automatically increase the number of (or size of) features such as vias, to increase the likelihood of forming a desired electrical contact (increasing yield); and as such processing can reduce the size of portions of the IC design on multiple levels (where appropriate) to increase circuit density. In order to accomplish this, these methods automatically measure the unaltered spacing of the vias in the reduced IC design (or more accurately in the unmodified reduced design at this point in processing), as shown in item 206.

With this, the methods herein can evaluate whether there is movement flexibility (or density flexibility) within the wiring levels of the unmodified reduced design, in item 210. Density flexible (or movement flexible) regions are regions that do not affect the functionality of the IC. In contrast, density locked regions are those regions of an IC design where the lengths of the features, and the spacing between features actually defines or affects the functionality of that portion of the IC. Density locked regions should not be changed, because such would change or alter the functionality of the IC. In contrast, density flexible (or movement flexible) regions that do not affect the functionality of the IC, can be changed. In essence, it a region is not density locked, it is density flexible.

When there is movement flexibility in all levels in item 210, these methods may uniformly reduce the size of features within the wiring levels of the unmodified reduced design in item 212, but again only if the identified regions of all affected wiring levels have movement flexibility. Such processing can reduce the size of portions of the IC design on multiple levels, where appropriate, and this can increase circuit density.

Regardless of whether there is movement flexibility in all levels in item 210, other design modifications can still be undertaken. Therefore, processing can proceed from item 210 or 212 to item 220, where these methods check to see if the spacing around various vias in the reduced IC design is greater, less than, or equal to a design objective driven spacing measure (which is simply referred to herein as a "first" spacing measure, or simply "spacing measure"). This first spacing measure is larger than the reduced minimum spacing, but otherwise can be any design-driven measurement criteria (and, therefore, the first spacing measure could be larger or smaller than the original minimum spacing).

If the spacing around a via equals or exceeds the first spacing measure in item 220, the methods herein can, in item 222, alter the reduced IC design by automatically replacing that via in the original IC design with multiple vias in the reduced IC design, in the general area where the single via was located in the original IC design. In other words, a redundant via can be added when the spacing around a via equals or exceeds the first spacing measure to increase the likelihood that at least one of the two vias will form the desired electrical connection.

Alternatively, if the unaltered spacing around the single via is between the reduced minimum spacing and the first spacing measure in item 220, these methods can, in item 224, automatically replace that via in the original IC design with a via bar in the reduced IC design, in the general area where the single via was located in the original IC design. Again, these processes that automatically increase the number of (or size of) features such as vias, increase the likelihood of forming a desired electrical contact, which increases yield by decreasing defects.

Addition alterations and adjustments can be made to the reduced IC design by methods herein. Therefore, processing can flow to any, or all, of items 230, 232, 234 from many of the other processes, including items 204, 212, 222, and 224. For example, as shown in item 230, these methods can automatically place the vias in the reduced IC design in different locations relative to where corresponding ones of the vias were located in the original IC design, so as to decrease spacing between vias (decrease via-via spacing) and increase spacing between vias and adjacent conductive features (increase via-wire spacing). In other alternatives, in item 232, methods herein can reduce the distances between conductive line ends to the reduced minimum spacing, while maintaining the vias that are adjacent the conductive line ends in the same locations where the vias were located in the original IC design. More specifically, the process of reducing distances between conductive line ends, in item 232, can be performed by extending lengths of the conductive lines. In addition, in item 234, these methods can reduce the widths of cuts made on conductive lines to the reduced minimum spacing, while maintaining the vias that are adjacent the cuts in the same locations where the vias were located in the original IC design. Again, these processes can increase the likelihood of forming a desired electrical contact, which increases yield by decreasing defects.

Processing can flow from any of items 212, 222, 224, 230, 232, and/or 234 to the manufacturing shown in item 240. Thus, after such adjustments are made to the reduced IC design, in item 240, these methods can manufacture ICs using the reduced IC design, as modified by the processing in items 212, 222, 224, 230, 232, and/or 234.

Figure 2:
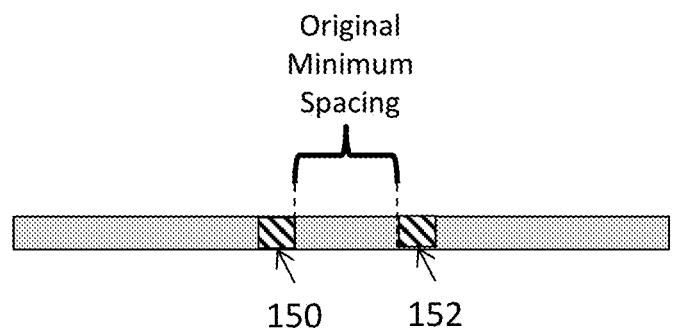
FIG. 2 is a top (plan) view showing multiple wiring levels and vias of an integrated circuit design, according to embodiments herein.
Figure 3:
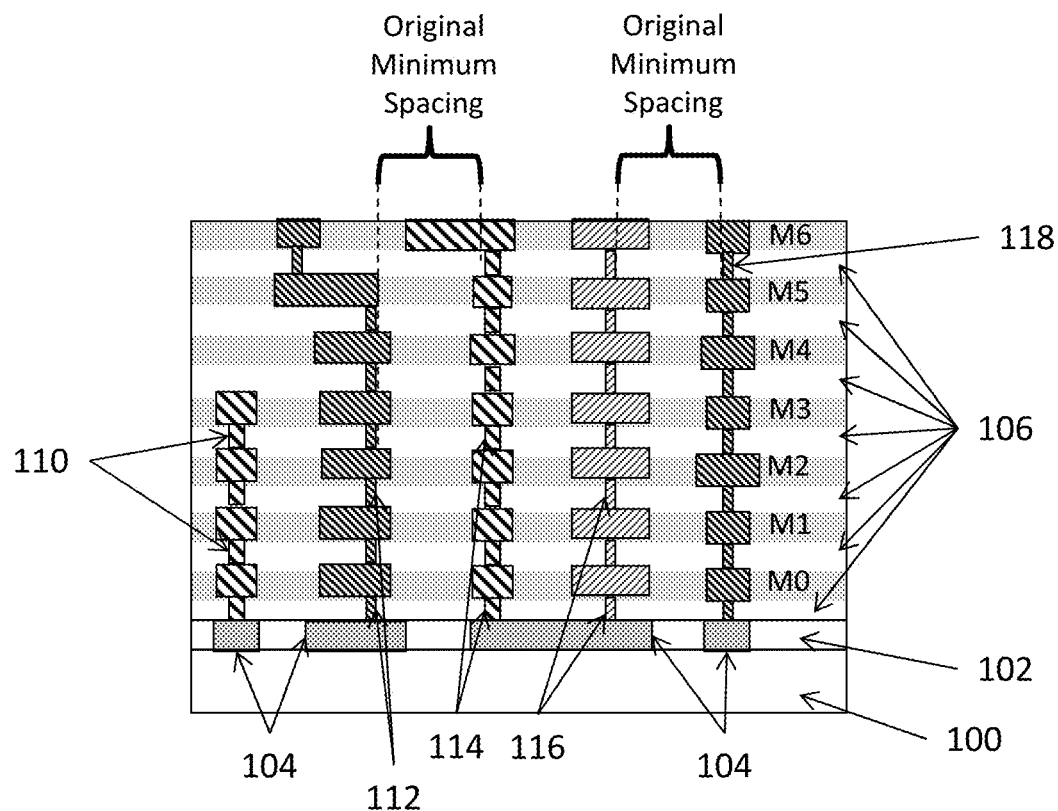
FIG. 3 is a side, or cross-section, view showing multiple wiring levels and vias of an integrated circuit design, according to embodiments herein.

As noted above, the methods and systems herein access an original integrated circuit (IC) design, such as the designs shown in FIGS. 2 and 3 (and this corresponds to step 202, shown in FIG. 1). More specifically, FIG. 2 illustrates a top view of one design that shows vias 150, 152 between various wiring levels. FIG. 3 illustrates (in side view) a different design that includes a substrate 100, and an electronic device level 102 on the substrate 100. The electronic device level 102 includes active and passive electronic devices 104

(transistors, capacitors, diodes, etc.; which may form logical devices). Various alternating insulator layers 106 and wiring layers M0-M6 are on, and are connected to the electronic devices 104 in the electronic device level 102 through conductive vias 110, 112, 116, 118 that extend through the insulator layers 106. Using via spacing as one example of a design rule change that can be accommodated by methods and systems herein, FIGS. 2 and 3 illustrate the smallest spacing exists between vias 110, 112, 114, 116, and 118 in the original integrated circuit design, and such is referred to herein as an original minimum spacing.

Figure 4:
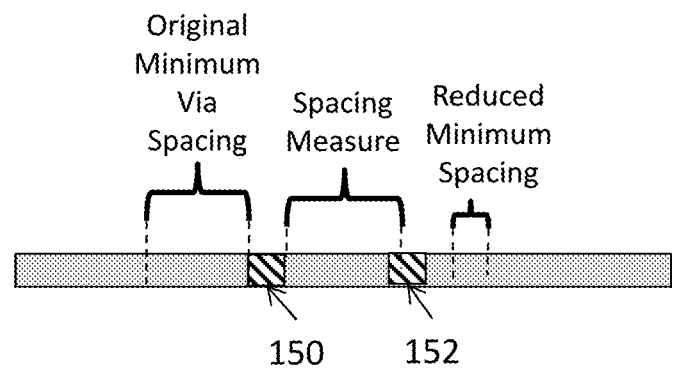
FIG. 4 is a top (plan) view showing multiple wiring levels and vias of an integrated circuit design, according to embodiments herein.
Figure 5:
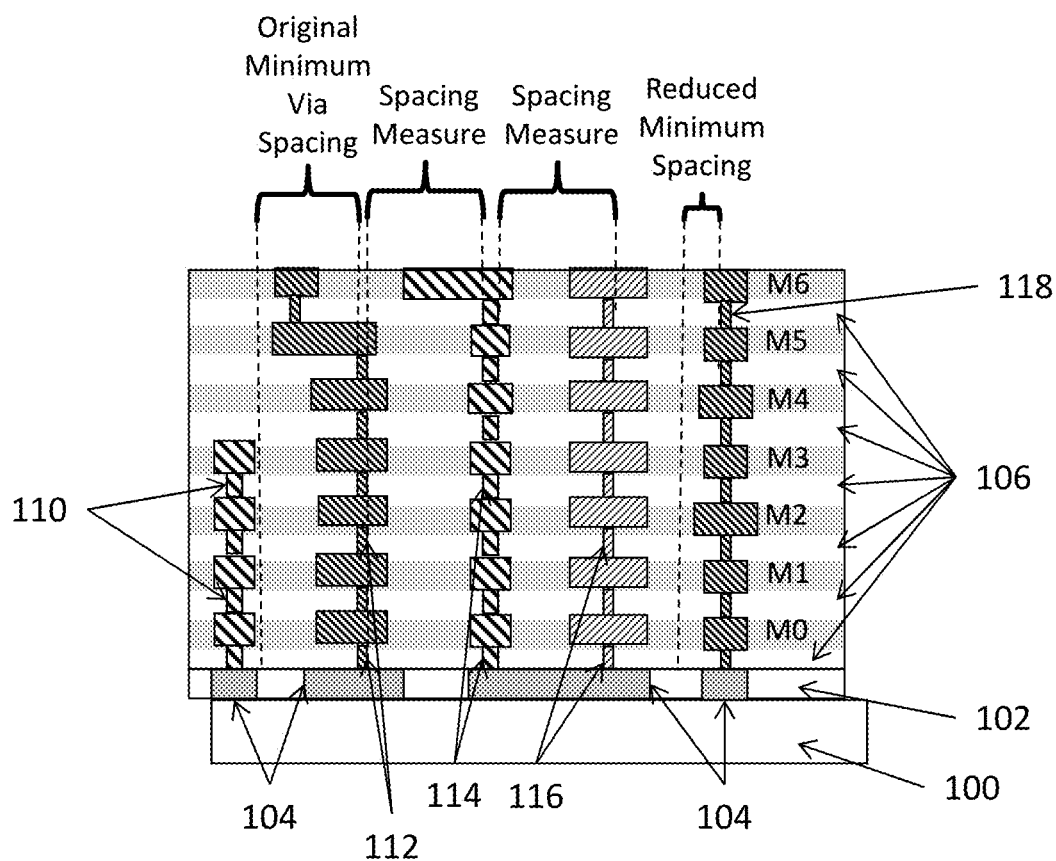
FIG. 5 is a side, or cross-section, view showing multiple wiring levels and vias of an integrated circuit design, according to embodiments herein.

These methods automatically convert the original IC design to a reduced IC design, as shown in FIGS. 4 and 5 (and this corresponds to step 202, shown in FIG. 1). Similarly to FIGS. 2 and 3, above, FIG. 4 illustrates a top view of one design, and FIG. 5 illustrates (in side view) a different design. In the designs shown in FIGS. 4 and 5, the smallest spacing between elements in the reduced IC design is a reduced minimum spacing that is less than the original minimum spacing. FIGS. 4 and 5 also illustrate another spacing measure (which is referred to herein arbitrarily as a spacing measure or first spacing measure) that is larger than the reduced minimum spacing. As shown in FIGS. 4 and 5, all the vias 110, 112, 114, 116, 118, 150, and 152 are spaced more than the reduced minimum spacing; vias 112 and 114 are spaced an amount equal to the spacing measure; vias 114 and 116 are spaced less than the spacing measure; and vias 150 and 152 are spaced further apart than the spacing measure.

Figure 6:
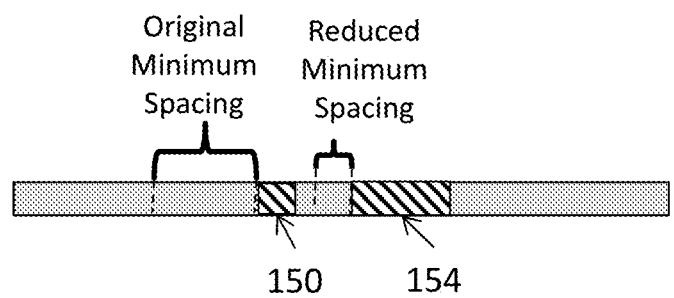
FIGS. 6 and 7 are top (plan) views showing multiple wiring levels and vias of an integrated circuit design, according to embodiments herein.
Figure 7:
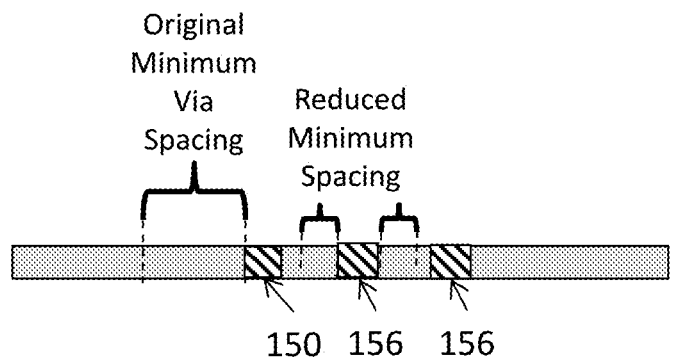
Figure 8:
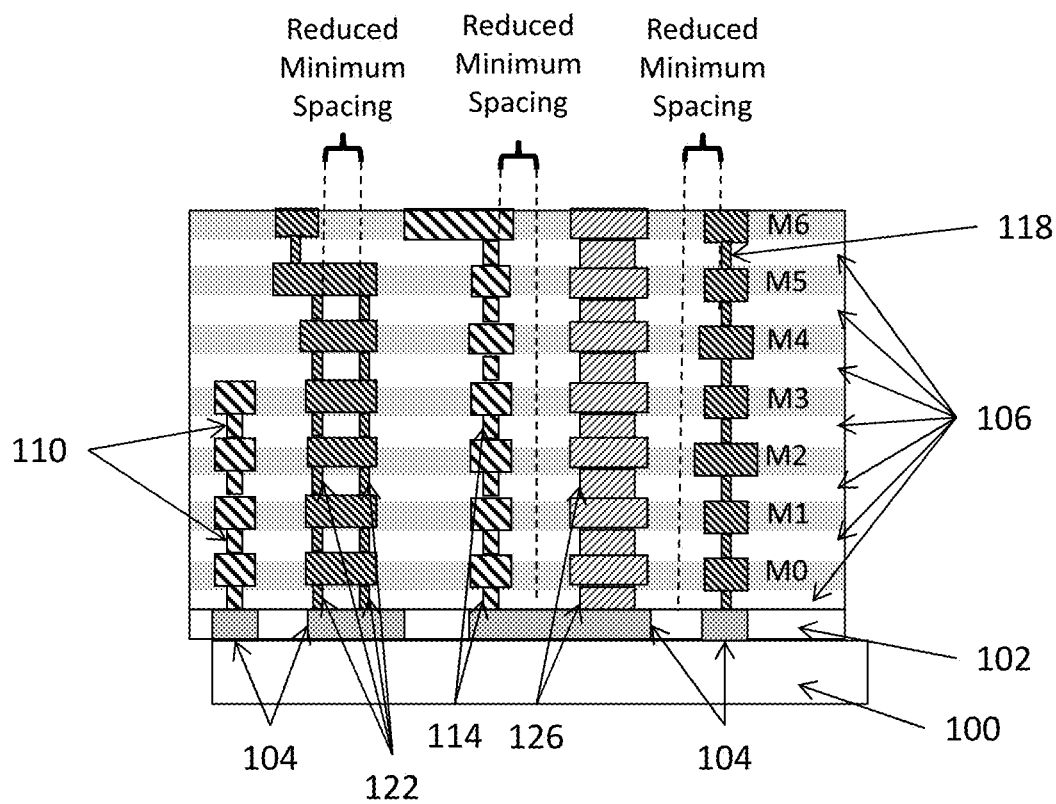
FIG. 8 is a side, or cross-section, view showing multiple wiring levels and vias of an integrated circuit design, according to embodiments herein.

Thus, as shown in FIGS. 4 and 5, these methods and systems automatically measure the unaltered spacing of the vias in the reduced IC design, in locations where the vias were located in the original IC design (and this corresponds to step 206, shown in FIG. 1). FIGS. 6-8 illustrate some changes that can be made to the elements in the original IC design depending upon the measurements shown in FIGS. 4 and 5. As with the previous drawings, FIGS. 6 and 7 illustrate a top view of one design, and FIG. 8 illustrates (in side view) a different design.

With respect to such alterations, if the unaltered spacing around the single via is between the reduced minimum spacing and the first spacing measure, such as vias 150-152 shown in FIG. 4, or vias 114-116 shown in FIG. 5, these methods can automatically replace the single via (e.g., 152 and 116) in the original IC design with a via bar 154 and 126 in the reduced IC design, in areas where the single via was located in the original IC design, as shown in FIGS. 6 and 8. This corresponds to step 224, shown in FIG. 1. Note that the bar vias 126 and 154 shown in FIGS. 6 and 8 are still spaced apart at least the reduced minimum spacing.

Similarly, if the unaltered spacing around the single via equals or exceeds the spacing measure (as is present between vias 112-114, shown in FIG. 5; and presuming for sake of example the spacing between vias 150-152 equals or exceeds the spacing measure, which is not illustrated in FIG. 4), this allows the methods and systems herein to automatically replace a single via 112 or 152 in the original IC design with multiple vias 122 and 156 in the reduced IC design, in areas where the single via was located in the original IC design, as shown in FIGS. 7 and 8. This corresponds to step 222, shown in FIG. 1. Note that the multiple vias 122 and 156 are still spaced apart at least the reduced minimum spacing. Again, these processes can increase the likelihood of forming a desired electrical contact, which increases yield by decreasing defects.

Figure 9:
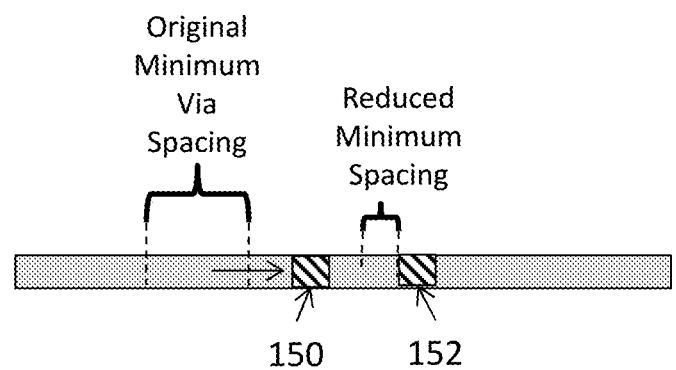
FIG. 9 is a top (plan) view showing multiple wiring levels and vias of an integrated circuit design, according to embodiments herein.
Figure 10:
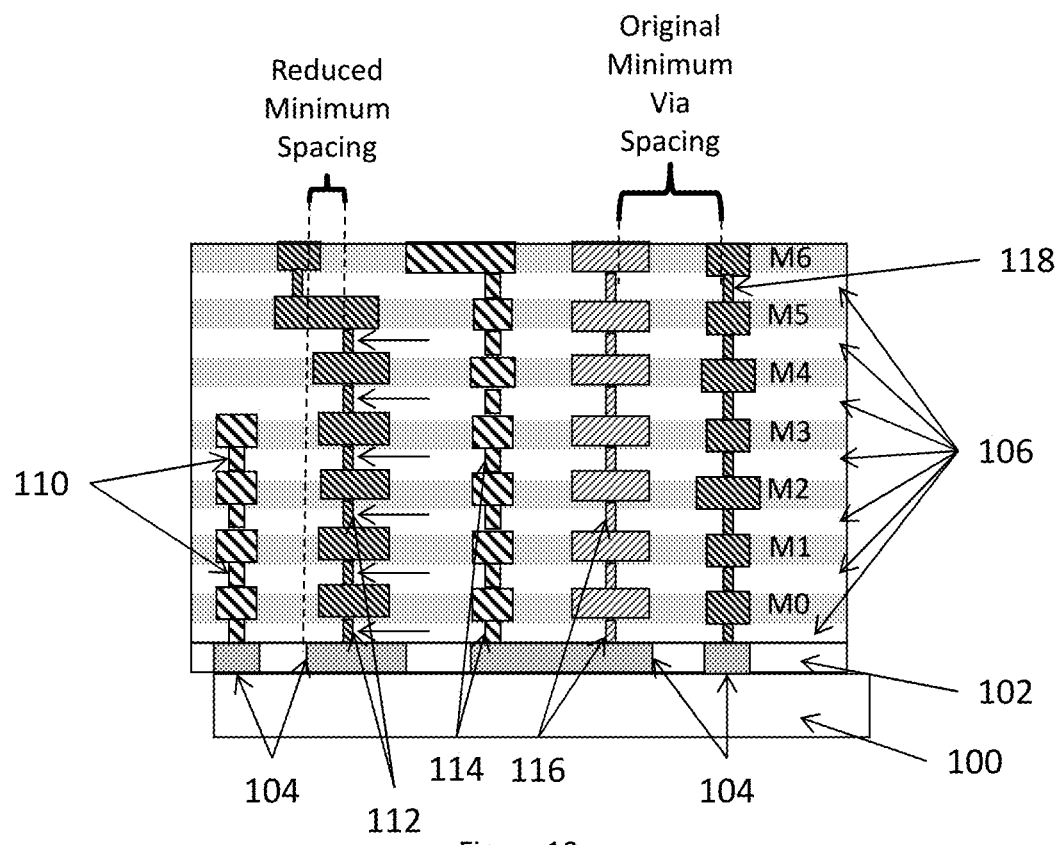
FIG. 10 is a side, or cross-section, view showing multiple wiring levels and vias of an integrated circuit design, according to embodiments herein.

Additionally, such methods can place the vias in the reduced IC design in different locations relative to where corresponding ones of the vias were located in the original IC design, so as to decrease spacing between vias and increase spacing between vias and adjacent conductive features (as shown by the arrows in FIGS. 9 and 10; and this corresponds to step 230, shown in FIG. 1). Similarly to the Figures above, FIG. 9 illustrates a top view of one design, and FIG. 10 illustrates (in side view) a different design. As can be seen in FIG. 9, moving via 150 in the direction of the arrow moves the vias 150-152 closer to one another (but not below the reduced minimum spacing) and this moves via 150 away from wire 140. Similarly, in FIG. 10, moving vias 112 moves vias 110-112 closer together, but moves vias 112 further from other wiring shown in FIG. 10. Again, these processes can increase the likelihood of forming a desired electrical contact, which increases yield by decreasing defects.

Figure 11A:
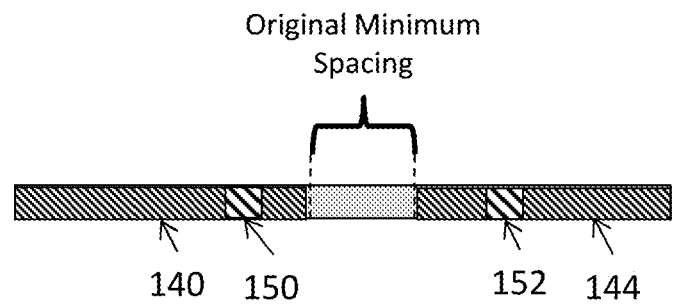
FIGS. 11A-15C are top (plan) views showing wiring levels and vias of an integrated circuit design, according to embodiments herein.
Figure 11B:
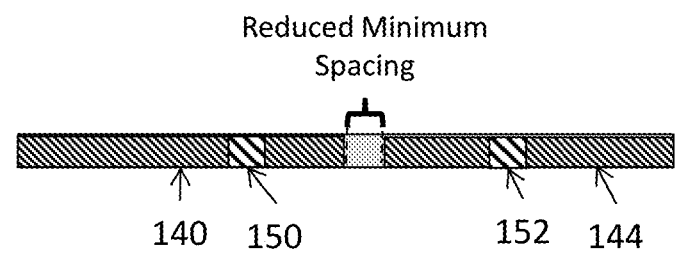
Figure 12A:
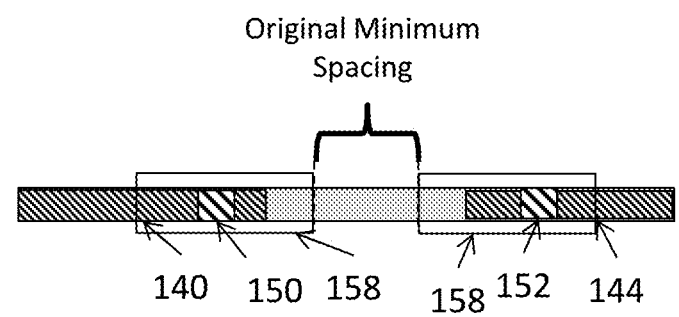
Figure 12B:
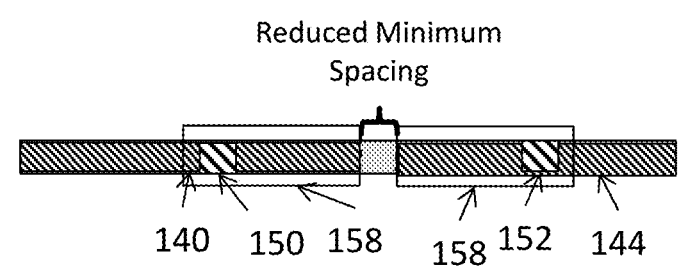

In other alternatives, as shown in FIGS. 11A-11B (which illustrate a top view of metal lines 140, 144 and vias 150, 152 superimposed thereon) methods and systems herein can reduce the distances between conductive line ends to the reduced minimum spacing, while maintaining the vias that are adjacent the conductive line 140-144 ends in the same locations where the same were located in the original IC design (and this corresponds to step 232, shown in FIG. 1). More specifically, the process of reducing distances between conductive line 140-144 ends is performed by extending lengths of the conductive lines 140-144 in, for example, direct metal patterning. As shown in FIGS. 12A-12B (which similarly illustrate a top view of metal lines 140, 144 and vias 150, 152 superimposed thereon) the same can be performed with respect to the hammerheads 158 regularly formed at line ends. The use of hammerheads 158 provides minimum space values on line ends, and this increases the accuracy of the via landing on the line end, therefore increasing yield.

Figure 13A:
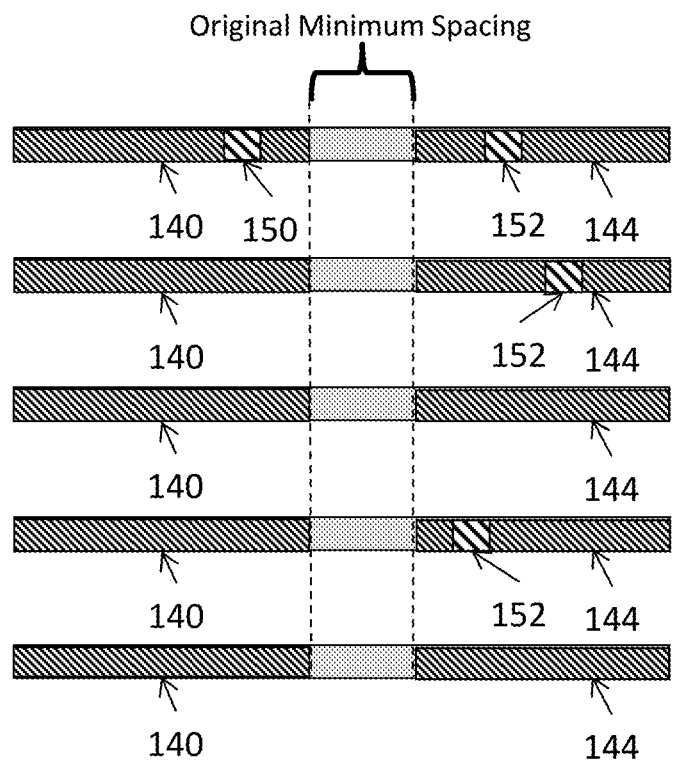
Figure 13B:
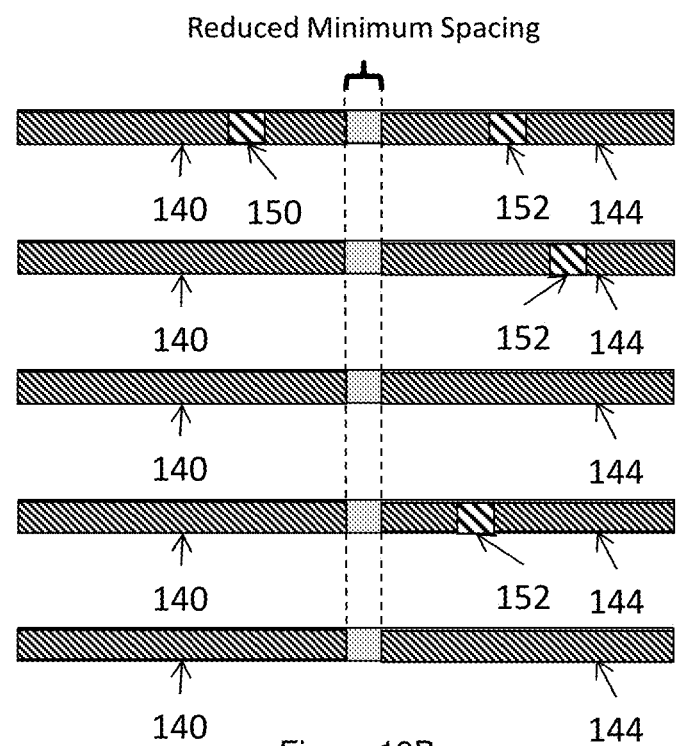
Figure 14A:
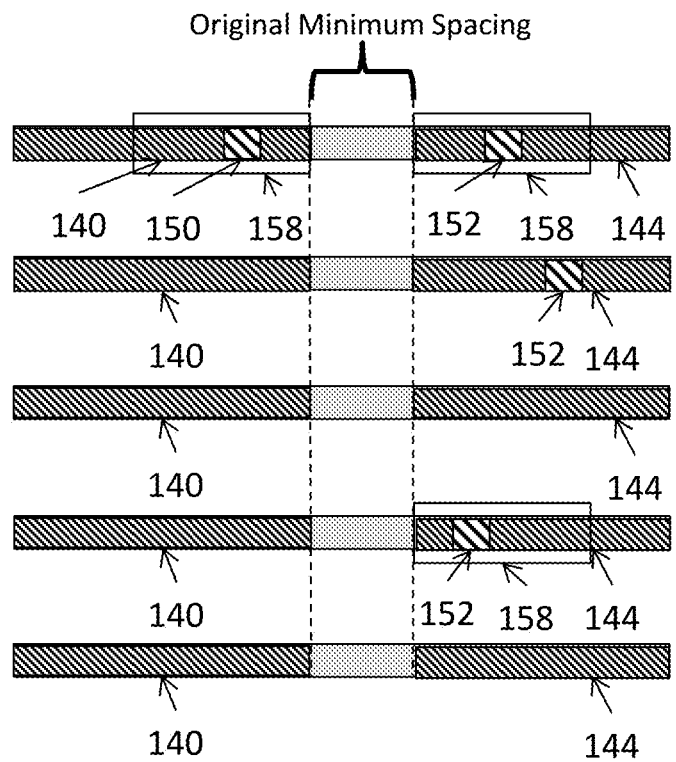
Figure 14B:
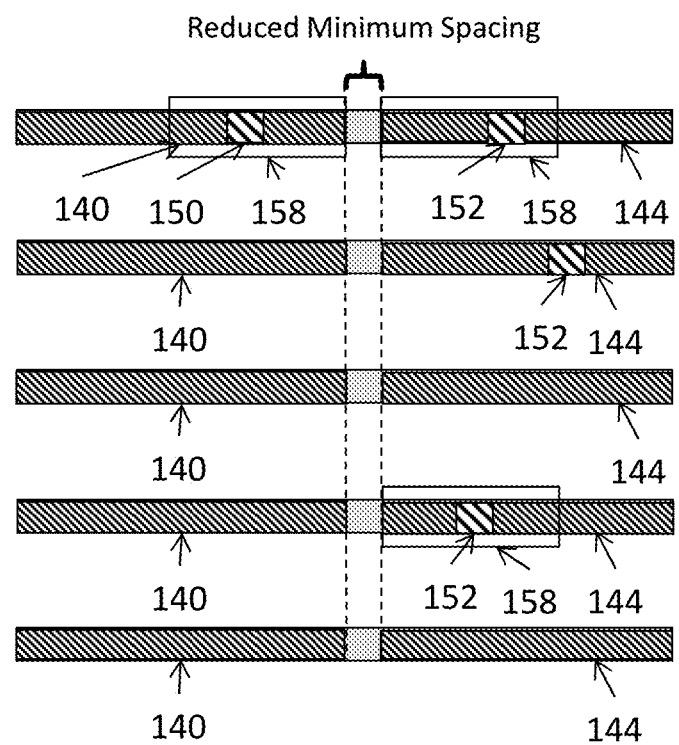

Also, as shown in FIGS. 13A-13B (which also illustrate a top view of multiple parallel metal lines 140, 144 within a wiring layer, and vias 150, 152 superimposed thereon) these methods can reduce the widths of cuts made to define separate conductive lines to the reduced minimum spacing, while maintaining the vias that are adjacent the cuts in the same locations where the vias were located in the original IC design (and this corresponds to step 234, shown in FIG. 1). As shown in FIGS. 14A-14B (which similarly illustrate a top view of multiple parallel metal lines 140, 144 and vias 150, 152 superimposed thereon) the same can be performed with respect to the hammerheads 158 regularly formed at line ends.

Figure 15A:
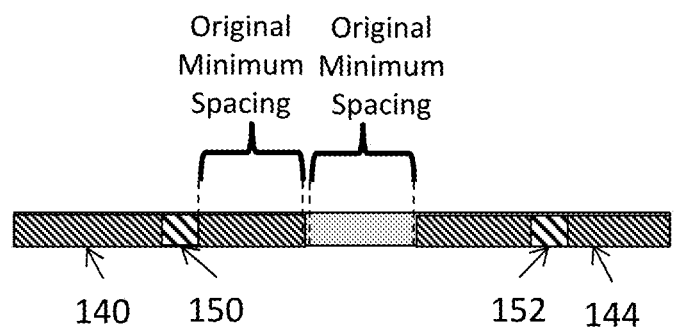
Figure 15B:
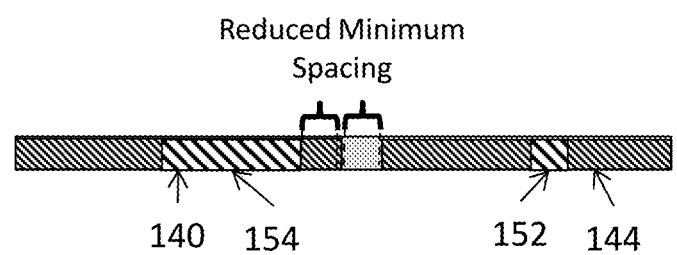
Figure 15C:
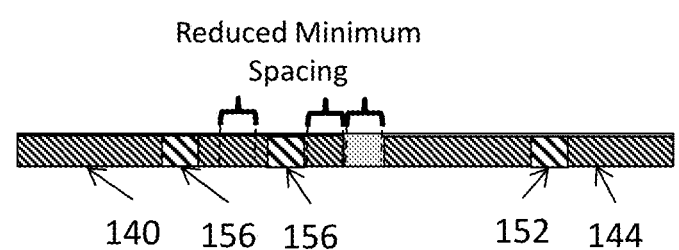

As shown in FIGS. 15A-15C (which illustrate a top view of metal lines 140, 144 and vias 150, 152 superimposed thereon) with an automated redesign of the metal layers herein, the metal lines can be extended to allow the addition of redundant via and/or change to via bar are automatically identified. More specifically, as shown in FIG. 15A the ends of the lines 140-144 can be spaced according to the original minimum spacing in the original design. As shown in FIG. 15B, the methods and systems herein can reduce the spacing between the ends of the lines 140-144 to the reduced minimum spacing rules by lengthening lines 140-144. This allows methods and systems herein to automatically replace via 150 with a bar via 154; and, even though bar via 154 is wider than via 150, because the conductive line 140 has been lengthened, the bar via 154 is still more than the reduced minimum spacing from other features. Similarly, as shown in FIG. 15C, this allows methods and systems herein to automatically replace via 150 with a multiple vias 156; and, even though the multiple vias 156 consume a wider space than via 150, because the conductive line 140 has been lengthened, the multiple vias 156 are still spaced more than the reduced minimum spacing from other features. Again, these processes can increase the likelihood of forming a desired electrical contact, which increases yield by decreasing defects.

Further, as shown in FIGS. 16A-16C (which present a perspective view of conductive lines 140 on multiple levels connected by vias 150) such methods can evaluate movement flexibility (or density flexibility) of the vias within each of the wiring levels of the unmodified reduced design (this corresponds to step 210, shown in FIG. 1). Density locked regions 160, shown in FIG. 16B, are those regions of an IC design where the lengths of the features, and the spacing between features actually defines or affects the functionality of that portion of the IC. Density locked regions 160 should not be changed, because such would change or alter the functionality of the IC. In contrast, FIG. 16C illustrates density flexible (or movement flexible) regions 162 that do not affect the functionality of the IC and can be changed.

Therefore, movement flexibility 162 (FIG. 16C) of the IC design shown in FIG. 16A occurs where there are not density locked regions 160 (FIG. 16B). The methods and systems herein avoid modifying the IC design unless all affected levels can be modified without altering functionality. Therefore, only when there are movement flexibility regions 162 in all affected levels will these methods relocate the vias within the wiring levels (this corresponds to step 212, shown in FIG. 1). More specifically, elements in the movement flexible regions 162 can be moved or resized to be closer to one another (up to the limit of the reduced minimum spacing) when modifying the movement flexible regions 162.

The circuit designer can manually designate regions as density locked regions 160 when creating the IC design, or manually designate density locked regions 160 of existing IC designs. In other alternatives, the methods and systems herein can automatically identify density locked regions 160. Thus, the methods and systems herein can automatically match shapes of the accessed IC design to known functional spacing and lengths, to identify density locked regions 160. Therefore, if a pattern of wire lengths and via spacing is previously known to define functionality or logic, and a matching pattern exists in the IC design, the methods and systems herein automatically identify those as density locked regions 160, so that they will not be modified. In other alternatives, the methods and systems herein can automatically identify density flexible regions 162 as those regions that do not match known functional shapes, spacing, lengths, etc. The movement flexibility regions 162 are, therefore, any regions that are not automatically identified as density locked regions 160. Such processing can reduce the size of portions of the IC design on multiple levels, where appropriate, and this can increase circuit density.

Figure 17:
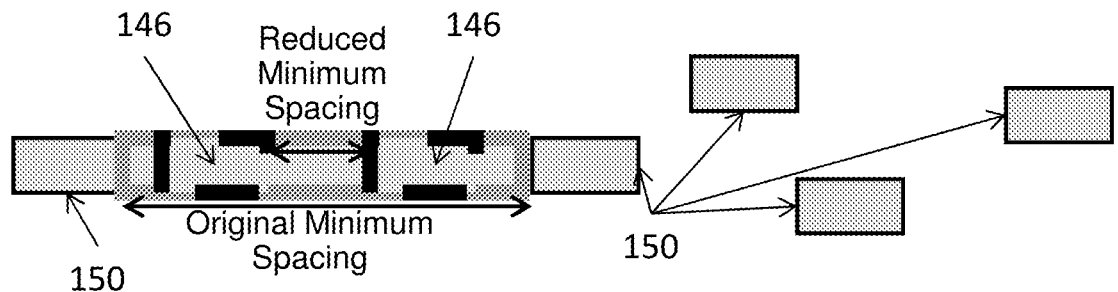
FIGS. 17-18C are top (plan) views showing wiring levels and vias of an integrated circuit design, according to embodiments herein.

FIG. 17 provides an additional top view illustration comparing the original minimum spacing with the reduced minimum spacing. More specifically, a pattern of various vias 150 are shown in FIG. 17 with locations 146 to which the vias 150 could be relocated, without violating the reduced minimum spacing. However, note that such locations 146 would violate the original minimum spacing, and this demonstrates how the methods and systems herein and help reduce circuit size when, for example, there are movement flexibility regions 162 in all affected levels.

Figure 18A:
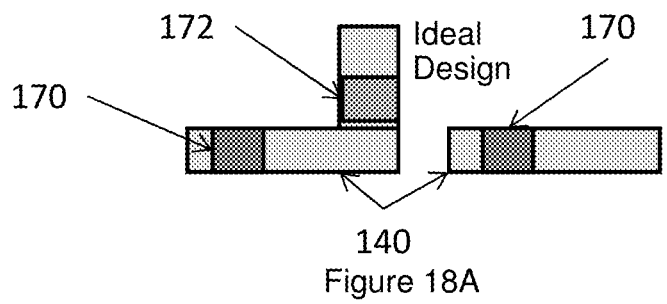
Figure 18B:
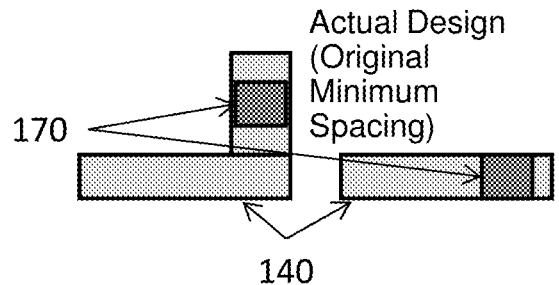
Figure 18C:
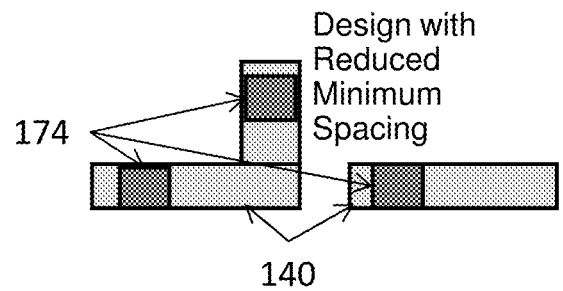

FIGS. 18A-18C illustrate top view representations of vias 170-174 landed on conductive shapes 140, and illustrate that while an original IC design utilizes multiple lithographic masks to land vias on conductive structures, the reduced IC design produced by methods and systems herein utilizes a single lithographic mask to land the same vias on the same conductive structures in the original IC design. FIG. 18A illustrates an ideal design where the designer would like to include three vias 170-172 (where vias 170 are patterned using a first mask/exposure, and via 172 is patterned using a second mask/exposure); however, because of the original minimum spacing rules, the actual design (shown in FIG. 18B) can only include two vias 150. For example, the third via 172 that is missing in FIG. 18B may have been included in a different mask from the remaining vias 170; and that third via 172 may have been excluded in the actual design because of difficulty aligning the third via 172 on the second mask with the vias 170 on the first mask. In contrast, because of the reduced minimum spacing provided by the methods and systems herein, as shown in FIG. 18C, the ideal design can be successfully produced by including all three vias 174. For example, with the reduced minimum spacing, all three vias 174 can be included on the same mask, avoiding the alignment issues that prevented the third via 172 from being included in the actual design shown in FIG. 18B.

FIGS. 18A-18C illustrate how methods and systems herein overcome issues that occur when via levels are printed with multiple masks, because the lithography tool cannot print the resolution needed to have all vias on one mask. Coloring is a methodology where multiple masks are used to print the same level. The via level can be colored if some of the vias are printed with a mask that can resolve down to X nm. However, if there is a need to print <Xnm in distance, one via is placed on one color (mask) and another via on the other color (mask). Therefore, a mask with EUV does not have overlay (color) conflict concerns. Thus, with the use of multiple colors (masks), overlay becomes a challenge. When printing two colors of vias (two different masks) that will land on the same metal, it is difficult to pattern one of the vias close to a bend due to an increased risk associated with overlay. With the implementation of EUV, coloring is reduced. For vias that have a larger space due to coloring (if such are on the same color/mask) conversion to EUV reduces the minimum space. With EUV, all levels can be placed on one mask (one color). There are no longer constraints on the location/landing spot of the vias due to overlay concerns (because there are less masks to align).

Figure 19:
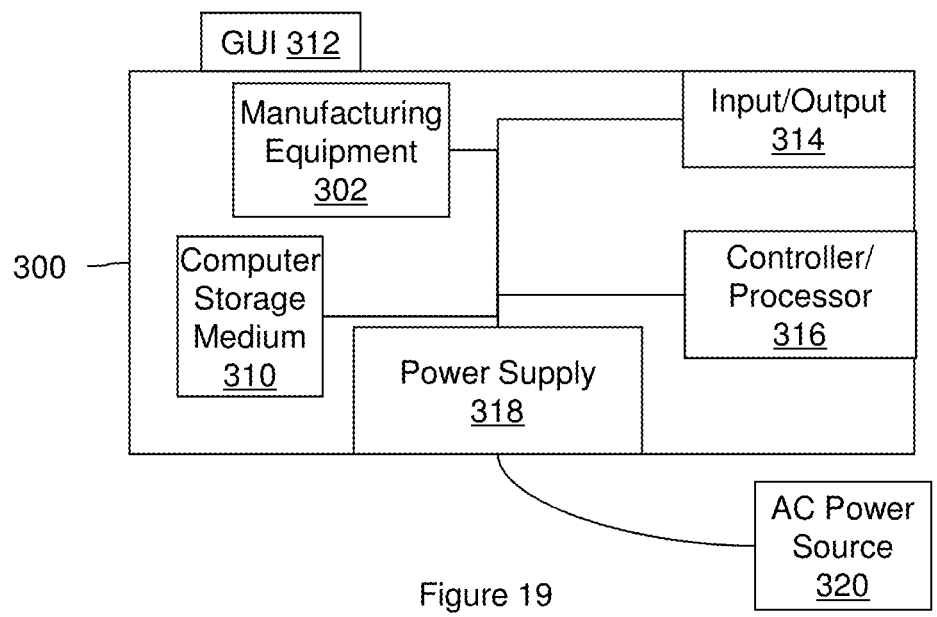
FIG. 19 is a system diagram according to embodiments herein.

Additionally, as shown in FIG. 19, various manufacturing system 300 herein include, among other components, at least one electronic storage 310 that maintains the original integrated circuit (IC) design, IC manufacturing equipment 302, a graphic user interface (GUI) 312, an input/output 314 that could be connected to a external network, a controller/processor 316, a power supply 318 that is connected to some external power source 320, etc.

With these systems 300 a processor 316 is operatively connected to the electronic storage 310. The processor 316 automatically converts the original IC design to a reduced IC design, and again, the smallest spacing between elements in the reduced IC design is referred to as the reduced minimum spacing, and such is less than the original minimum spacing.

The processor 316 automatically measures unaltered spacing of the vias (where the vias in the reduced IC design are in unaltered locations where the vias were located in the original IC design). The processor 316 can automatically replace a single via in the original IC design with multiple vias in the reduced IC design, in areas where the single via was located in the original IC design, if the unaltered spacing around the single via equals or exceeds a first spacing measure (which is larger than the reduced minimum spacing). Alternatively, the processor 316 can automatically replace the single via in the original IC design with a via bar in the reduced IC design, in areas where the single via was located in the original IC design, if the unaltered spacing around the single via is between the reduced minimum spacing and the first spacing measure (e.g., is less than first spacing measure).

Additionally, the processor 316 can automatically place the vias in the reduced IC design in different locations relative to where corresponding ones of the vias were located in the original IC design to decrease spacing between vias and increase spacing between vias and adjacent conductive features. Also, the processor 316 can automatically reduce distances between conductive line ends to the reduced minimum spacing, while maintaining the vias that are adjacent the conductive line ends in the same locations where the vias were located in the original IC design. For example, the processor 316 can reduce the distances between conductive line ends by extending lengths of the conductive lines. Further, the processor 316 can automatically reduce widths of cuts made on conductive lines to the reduced minimum spacing, while maintaining locations the vias that are adjacent the cuts in the same locations where the vias were located in the original IC design.

The processor 316 can also evaluate whether there is movement flexibility (or density flexibility) within all the wiring levels of the unmodified reduced design. When there is movement flexibility in all levels, the processor may uniformly reduce the size of features within the wiring levels of the unmodified reduced design, but again only if the identified regions of all affected wiring levels have movement flexibility.

Also, manufacturing equipment 302 is operatively connected to the processor 316, and such manufacturing equipment 302 manufactures ICs using the reduced IC design. For example, the manufacturing equipment 302 can include chambers in which various layers are deposited, photolithographic equipment which forms masks on the layers, etching chambers that pattern the layers through the masks, polishing equipment, etc.; all of which can form electronic devices, insulator layers, wiring layers, and external connections to produce finished IC devices.

The conductors mentioned herein can be formed of any conductive material, such as polycrystalline silicon (polysilicon), amorphous silicon, a combination of amorphous silicon and polysilicon, and polysilicon-germanium, rendered conductive by the presence of a suitable dopant. Alternatively, the conductors herein may be one or more metals, such as tungsten, hafnium, tantalum, molybdenum, titanium, or nickel, or a metal silicide, any alloys of such metals, and may be deposited using physical vapor deposition, chemical vapor deposition, or any other technique known in the art.

There are various types of transistors, which have slight differences in how they are used in a circuit. For example, a bipolar transistor has terminals labeled base, collector, and emitter. A small current at the base terminal (that is, flowing between the base and the emitter) can control, or switch, a much larger current between the collector and emitter terminals. Another example is a field-effect transistor, which has terminals labeled gate, source, and drain. A voltage at the gate can control a current between source and drain. Within such transistors, a semiconductor (channel region) is positioned between the conductive source region and the similarly conductive drain (or conductive source/emitter regions), and when the semiconductor is in a conductive state, the semiconductor allows electrical current to flow between the source and drain, or collector and emitter. The gate is a conductive element that is electrically separated from the semiconductor by a "gate oxide" (which is an insulator); and current/voltage within the gate changes makes the channel region conductive, allowing electrical current to flow between the source and drain. Similarly, current flowing between the base and the emitter makes the semiconductor conductive, allowing current to flow between the collector and emitter.

Generally, transistor structures are formed by depositing or implanting impurities into a substrate to form at least one semiconductor channel region, bordered by shallow trench isolation regions below the top (upper) surface of the substrate. A "substrate" herein can be any material appropriate for the given purpose (whether now known or developed in the future) and can be, for example, silicon-based wafers (bulk materials), ceramic materials, organic materials, oxide materials, nitride materials, etc., whether doped or undoped.

While only one or a limited number of devices are illustrated in the drawings, those ordinarily skilled in the art would understand that many different types devices could be simultaneously formed with the embodiment herein and the drawings are intended to show simultaneous formation of multiple different types of devices; however, the drawings have been simplified to only show a limited number of devices for clarity and to allow the reader to more easily recognize the different features illustrated. This is not intended to limit this disclosure because, as would be understood by those ordinarily skilled in the art, this disclosure is applicable to structures that include many of each type of devices shown in the drawings.

The flowchart and block diagrams in the figures illustrate the architecture, functionality, and operation of possible implementations of devices and methods according to various embodiments. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the foregoing. As used herein, the singular forms "a," "an," and "the" are intended to include the plural forms as well, unless the context clearly indicates otherwise. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element.

Each respective figure, in addition to illustrating methods of and functionality of the present embodiments at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method described above. In other words, one or more computer hardware devices can be created that are configured to implement the method and processes described herein with reference to the figures and their corresponding descriptions.

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments herein. The embodiments were chosen and described in order to best explain the principles of such, and the practical application, and to enable others of ordinary skill in the art to understand the various embodiments with various modifications as are suited to the particular use contemplated.

While the foregoing has been described in detail in connection with only a limited number of embodiments, it should be readily understood that the embodiments herein are not limited to such disclosure. Rather, the elements herein can be modified to incorporate any number of variations, alterations, substitutions, or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. A method of forming conductive structures in an integrated circuit (IC) device comprising:
    forming original IC conductive structures in the IC device, wherein a smallest spacing between elements in the original IC conductive structures is an original minimum spacing; and
    forming reduced IC conductive structures in the IC device, wherein a smallest spacing between elements in the reduced IC conductive structures is a reduced minimum spacing that is less than the original minimum spacing,
    wherein the original IC conductive structures are formed to include conductive lines having original spacing line ends separated by the original minimum spacing and original spacing vias spaced the original minimum spacing from the original spacing line ends, and
    wherein the reduced IC conductive structures are formed to include conductive lines having reduced spacing line ends separated by the reduced minimum spacing and reduced spacing vias spaced the reduced minimum spacing from the reduced spacing line ends.

2. The method according to claim 1,
    wherein the original spacing line ends are formed to have a single via, and
    wherein the reduced spacing line ends are formed to have multiple vias or
    a via bar.

3. The method according to claim 1, wherein the reduced spacing vias are formed further from the reduced spacing line ends relative to a distance the original spacing vias are from the original spacing line ends.

4. The method according to claim 1, wherein the reduced spacing line ends are formed to have an extended length from the reduced spacing vias relative to a length the original spacing line ends are from the original spacing vias.

5. The method according to claim 1, wherein the reduced spacing line ends are formed to have reduced widths of cuts relative to widths of cuts of the original spacing line ends.

6. The method according to claim 1,
    wherein the IC device includes multiple wiring levels separated by insulator levels, and wherein the wiring levels are connected through the insulator levels by the original spacing vias and the reduced spacing vias.

7. The method according to claim 1, wherein the reduced spacing line ends are formed in locations of the IC device having more movement flexibility relative to locations of the IC device in which the original spacing line ends are located, wherein the movement flexibility occurs in regions that have spacing that does not affect functionality of the IC device.

8. A method of forming conductive structures in an integrated circuit (C) device comprising:
    forming original IC conductive structures in the IC device, wherein a smallest spacing between elements in the original IC conductive structures is an original minimum spacing; and
    forming reduced IC conductive structures in the IC device, wherein a smallest spacing between elements in the reduced IC conductive structures is a reduced minimum spacing that is less than the original minimum spacing,
    wherein the original IC conductive structures are formed to include conductive lines having original spacing line ends separated by the original minimum spacing and original spacing vias spaced the original minimum spacing from the original spacing line ends,
    wherein the reduced IC conductive structures are formed to include conductive lines having reduced spacing line ends separated by the reduced minimum spacing and reduced spacing vias spaced the reduced minimum spacing from the reduced spacing line ends
    wherein the reduced spacing vias are formed as multiple vias in locations where spacing of adjacent features around a single via equals or exceeds a first spacing measure
    wherein the reduced spacing vias are formed as a via bar in locations where spacing of adjacent features around the single via is between the reduced minimum spacing and the first spacing measure.

9. The method according to claim 8, wherein the multiple vias decrease spacing between vias and increase spacing between vias and adjacent conductive features.

10. The method according to claim 8, wherein the reduced spacing vias are formed further from the reduced spacing line ends relative to a distance the original spacing vias are from the original spacing line ends.

11. The method according to claim 8, wherein the reduced spacing line ends are formed to have an extended length from the reduced spacing vias relative to a length the original spacing line ends are from the original spacing vias.

12. The method according to claim 8, further comprising reducing wherein the reduced spacing line ends are formed to have reduced widths of cuts relative to widths of cuts of the original spacing line ends.

13. The method according to claim 8,
    wherein the IC device includes multiple wiring levels separated by insulator levels, and wherein the wiring levels are connected through the insulator levels by the original spacing vias and the reduced spacing vias.

14. The method according to claim 8, wherein the reduced spacing line ends are formed in locations of the IC device having more movement flexibility relative to locations of the IC device in which the original spacing line ends are located, wherein the movement flexibility occurs in regions that have spacing that does not affect functionality of the IC device.

15. An integrated circuit (IC) device comprising:
    original IC conductive structures in the IC device, wherein a smallest spacing between elements in the original IC conductive structures is an original minimum spacing; and
    reduced IC conductive structures in the IC device, wherein a smallest spacing between elements in the reduced IC conductive structures is a reduced minimum spacing that is less than the original minimum spacing,
    wherein the original IC conductive structures include conductive lines having original spacing line ends separated by the original minimum spacing and original spacing vias spaced the original minimum spacing from the original spacing line ends, and
    wherein the reduced IC conductive structures include conductive lines having reduced spacing line ends separated by the reduced minimum spacing and reduced spacing vias spaced the reduced minimum spacing from the reduced spacing line ends.

16. The device according to claim 15, wherein the original spacing line ends have a single via, and wherein the reduced spacing line ends have multiple vias or a via bar.

17. The device according to claim 15, wherein the reduced spacing vias are further from the reduced spacing line ends relative to a distance the original spacing vias are from the original spacing line ends.

18. The device according to claim 15, wherein the reduced spacing line ends have an extended length from the reduced spacing vias relative to a length the original spacing line ends are from the original spacing vias.

19. The device according to claim 15, wherein the reduced spacing line ends have reduced widths of cuts relative to widths of cuts of the original spacing line ends.

20. The device according to claim 15, wherein the reduced spacing line ends are in locations of the IC device having more movement flexibility relative to locations of the IC device in which the original spacing line ends are located, wherein the movement flexibility occurs in regions that have spacing that does not affect functionality of the IC.

* * * * *